United States Patent
Lerch et al.

(10) Patent No.: US 7,535,356 B2
(45) Date of Patent: May 19, 2009

(54) IDENTIFICATION BAND USING A CONDUCTIVE FASTENING FOR ENHANCED SECURITY AND FUNCTIONALITY

(75) Inventors: John W. Lerch, Indialantic, FL (US); Joshua M. Girvin, Indialantic, FL (US); John P. Norair, Indialantic, FL (US)

(73) Assignee: Bartronics America, Inc., Santa Clara, CA (US)

( * ) Notice: Subject to any disclaimer, the term of this patent is extended or adjusted under 35 U.S.C. 154(b) by 77 days.

(21) Appl. No.: 11/291,095

(22) Filed: Nov. 29, 2005

(65) Prior Publication Data

US 2007/0120687 A1    May 31, 2007

(51) Int. Cl.
*G08B 13/12* (2006.01)
(52) U.S. Cl. .............. 340/568.2; 340/568.4; 340/568.1; 340/572.1
(58) Field of Classification Search .............. 340/568.1, 340/568.2, 568.4, 572.1, 572.3, 572.7–572.9, 340/573.1, 573.4
See application file for complete search history.

(56) References Cited

U.S. PATENT DOCUMENTS

| | | | |
|---|---|---|---|
| 4,736,196 A | 4/1988 | McMahon et al. | |
| 4,800,543 A | 1/1989 | Lyndon-James et al. | |
| 4,833,807 A | 5/1989 | McLean | |
| 4,835,372 A | 5/1989 | Gombrich et al. | |
| 4,885,571 A | 12/1989 | Pauley et al. | |
| 4,973,944 A | 11/1990 | Maletta | |
| 4,980,671 A | 12/1990 | McCurdy | |
| 5,364,133 A | 11/1994 | Hofer et al. | |
| 5,374,921 A | 12/1994 | Martin et al. | |
| 5,423,574 A | 6/1995 | Forte-Pathroff | |
| 5,430,441 A | 7/1995 | Bickley et al. | |
| 5,448,846 A | 9/1995 | Peterson et al. | |
| 5,457,906 A | 10/1995 | Mosher, Jr. | |
| 5,471,197 A | 11/1995 | McCurdy et al. | |
| 5,504,474 A | 4/1996 | Libman et al. | |
| 5,512,879 A | 4/1996 | Stokes | |
| 5,612,675 A | 3/1997 | Jennings et al. | |
| 5,627,520 A | 5/1997 | Grubbs et al. | |
| 5,781,442 A | 7/1998 | Engleson et al. | |
| 5,831,535 A | 11/1998 | Reisman et al. | |
| 5,883,576 A * | 3/1999 | De La Huerga | .......... 340/573.1 |

(Continued)

*Primary Examiner*—Toan N Pham
*Assistant Examiner*—Travis R Hunnings
(74) *Attorney, Agent, or Firm*—Hamilton, Brook, Smith & Reynolds, P.C.

(57) ABSTRACT

An identification device formed from a band of material and a non-reusable tamper-resistant fastening arranged to join opposite end regions of the band. A Radio Frequency Identification (RFID) transponder is disposed in the band. The transponder includes and RFID circuit, such as may be formed on an integrated circuit (IC) chip, and an antenna. In the present invention, the tamper-resistant fastening serves additional functions beyond securing the opposite end regions of the band together. Namely, the fastening can be made of a conductive material and designed to create electrical continuity between multiple conductors to enable or disable certain circuit functionality. In one variation, this continuity allows the excess tail portion of the wristband to be cut without disrupting circuit functionality. In another variation, the fastening mechanism is designed to crimp conductors together. In yet another embodiment, the RFID circuit itself is wholly or partially formed within the fastening mechanism to increase the better protect and support the circuit, as well as to make it more difficult to defeat the tamper-resistant functionality of the device.

5 Claims, 7 Drawing Sheets

U.S. PATENT DOCUMENTS

| | | | |
|---|---|---|---|
| 5,973,598 A | 10/1999 | Beigel | |
| 5,973,600 A * | 10/1999 | Mosher, Jr. | 340/572.8 |
| 5,977,877 A * | 11/1999 | McCulloch et al. | 340/572.8 |
| 5,979,941 A | 11/1999 | Mosher et al. | |
| 6,021,494 A | 2/2000 | Bolan et al. | |
| 6,043,746 A | 3/2000 | Sorrells | |
| 6,050,622 A * | 4/2000 | Gustafson | 292/307 R |
| 6,055,756 A | 5/2000 | Aoki | |
| 6,072,396 A | 6/2000 | Gaukel | |
| 6,104,295 A | 8/2000 | Gaisser et al. | |
| 6,107,920 A | 8/2000 | Eberhardt et al. | |
| 6,142,368 A | 11/2000 | Mullins et al. | |
| 6,144,303 A | 11/2000 | Federman | |
| 6,219,789 B1 | 4/2001 | Little et al. | |
| 6,255,951 B1 | 7/2001 | De La Huerga | |
| 6,335,907 B1 | 1/2002 | Momich et al. | |
| 6,346,886 B1 | 2/2002 | De La Huerga | |
| 6,349,493 B1 | 2/2002 | Newman et al. | |
| 6,352,045 B1 | 3/2002 | Takashima | |
| 6,352,205 B1 | 3/2002 | Mullins et al. | |
| 6,384,727 B1 | 5/2002 | Diprizio et al. | |
| 6,421,013 B1 | 7/2002 | Chung | |
| 6,424,623 B1 | 7/2002 | Borgstahl et al. | |
| 6,431,455 B1 * | 8/2002 | Ponert | 235/492 |
| 6,434,158 B1 | 8/2002 | Harris et al. | |
| 6,434,159 B1 | 8/2002 | Woodward et al. | |
| 6,472,989 B2 | 10/2002 | Roy, Jr. | |
| 6,474,557 B2 | 11/2002 | Mullins et al. | |
| 6,483,427 B1 | 11/2002 | Werb | |
| 6,663,006 B2 | 12/2003 | Mullins et al. | |
| 6,693,543 B1 * | 2/2004 | Stephenson et al. | 340/572.9 |
| 6,744,367 B1 | 6/2004 | Forster | |
| 6,772,546 B2 | 8/2004 | Latschbacher et al. | |
| 6,782,648 B1 | 8/2004 | Mosher, Jr. | |
| 7,019,711 B2 * | 3/2006 | Johnson et al. | 343/872 |
| 7,049,962 B2 * | 5/2006 | Atherton et al. | 340/572.1 |
| 2002/0003477 A1 | 1/2002 | Roy, Jr. | |
| 2002/0007292 A1 | 1/2002 | Paxton et al. | |
| 2002/0049656 A1 | 4/2002 | Lancos et al. | |
| 2002/0067264 A1 | 6/2002 | Soehnlen | |
| 2002/0070865 A1 | 6/2002 | Lancos et al. | |
| 2002/0082897 A1 | 6/2002 | Menelly et al. | |
| 2002/0084904 A1 | 7/2002 | De La Huerga | |
| 2003/0075608 A1 | 4/2003 | Atherton | |
| 2003/0173408 A1 | 9/2003 | Mosher, Jr. et al. | |
| 2004/0066296 A1 | 4/2004 | Atherton | |
| 2005/0168340 A1 * | 8/2005 | Mosher et al. | 340/572.8 |

* cited by examiner

Prior Art

Prior Art

IDENTIFICATION BAND USING A CONDUCTIVE FASTENING FOR ENHANCED SECURITY AND FUNCTIONALITY

FIELD OF THE INVENTION

The present invention relates to a non-reusable identification device that may be used to identify persons or articles.

BACKGROUND OF THE INVENTION

Disposable bracelets have long been used for such things as identification, access control, age verification, among other purposes. Such bracelets have typically been made from materials such as polyester, paper, or vinyl. The physical presence of a bracelet of particular color or design is traditionally used as its identifier. For example, such bracelets have been used in water parks and theme parks to quickly and uniquely identify patrons who have already paid for admission, or to control access to restricted areas. A patron of legal drinking age could obtain a bracelet to indicate that the patron is of legal age, granting the patron access to restricted areas such as beer sales areas.

In recent years, such bracelets have been augmented with Radio Frequency Identification (RFID) technology. RFID extends the usefulness of such bracelets, as they can each be programmed with a unique code that quickly and easily identifies the wearer. RFID also adds new functionality to such bracelets. As one example, they can be used to locate the wearer. Thus, with the installation of appropriate radio location equipment, a lost child wearing an RFID bracelet can be easily located or prevented from leaving an amusement park unless accompanied by an authorized adult.

RFID bracelets are also used to allow the purchase of items without the exchange of currency or need for a credit/debit card, or to allow secure communication and monetary exchange among patrons (for example, a parent may authorize credit of funds to a child to allow a purchase up to a preselected amount). Upon entering a park or other venue, a patron can request that the bracelet issued to the patron or the patron's family members be credited for purchases up to a preselected amount. Purchases up to the preselected amount can then be made using the bracelet instead of using cash or credit/debit cards. The bracelet can also be coded so that a wearer would be prevented from making certain purchases, or from making a single purchase above a chosen limit, so that children, for example, are encouraged to spend their allotted funds wisely.

RFID bracelets of the type described above are most often made to be disposable, so that they are inexpensive to produce and easy to use. However, such bracelets are susceptible to misuse and unauthorized use. Some bracelets are easy to remove, yet still function after removal. A bracelet that still functions after it has been removed provides the opportunity for patrons to exchange bracelets. This could provide patrons with the opportunity to give access to a restricted area to an unauthorized patron. A patron issued an "adult" bracelet that allows access to beer sales, for example, could remove and give or sell that bracelet to a patron not of legal drinking age. As another example, a thoughtlessly discarded bracelet that still has funds credited to it could be retrieved and used by an unauthorized individual to purchase goods or services using someone else's account.

A bracelet that is rendered non-functional after removal destroys its value for transfer to another patron, and would safeguard against unauthorized use of bracelets.

A number of mechanical measures have been taken to prevent such bracelets from being transferred. One approach is a single-use locking button mechanism found on some plastic bracelets. An example of this approach is found in U.S. Pat. No. 5,973,600. Also known are adhesive locking mechanisms with slits that prevent the wearer from peeling the adhesive back and reattaching it. An example of that approach is found in U.S. Pat. No. 6,474,557.

Those mechanisms render tampering with the lock or adhesive obvious to a visual inspection of the bracelet and, in most cases, render the bracelet unwearable after removal. However, tampering with the band portion of the bracelet is not prevented by those mechanisms. It is still possible for the bracelet to be cut or torn, and reattached with a simple piece of transparent tape or glue. To detect this sort of tampering, the person checking the bracelet would need to either make a full visual inspection of the bracelet or tug very firmly on the bracelet. This is slow, inconvenient, and impractical, especially when large numbers of people require identification. Furthermore, such a visual inspection is subject to human error, the most obvious being the failure of the bracelet checker to perform adequate inspection.

The use of RFID technologies has thus made the process of identifying the bracelet wearer faster and more secure, resulting in an increased use of bracelets for identification purposes and for facilitating transactions. However, this can lead to complacency among those responsible for inspecting bracelets, and has a tendency to reduce the likelihood that the person checking the bracelet wearer will perform an adequate visual or physical inspection.

Special electronic bracelets that prevent transferability for ensuring that hospital patients or prisoners remain within a given proximity of their quarters are known. However, such designs are prohibitively bulky, expensive, and overly complex for use in high-volume applications with short-term use. For example, U.S. Pat. Nos. 5,471,197 and 5,374,921 disclose the use of fiber optics to ensure that the bracelet is not removed. U.S. Pat. No. 6,144,303 describes a capacitive coupling between the bracelet and the wearer's skin. When the capacitance changes, indicating bracelet removal, an alarm is tripped. But the methods and devices disclosed in those patents are unnecessarily complex and prohibitively expensive for disposable use.

U.S. Pat. Nos. 4,973,944 and 4,980,671 describe bracelets with DC current paths that run around the bracelet and form a closed circuit when the ends of the bracelet are brought together. This method involves complications when attempting to use it with conventional disposable bracelet designs, as it requires a large metal contact area to enable size adjustment of the bracelet. It also does not necessarily solve the problem of tampering because such bracelets are designed to activate an alarm when removed, not necessarily to prevent reattachment. The metal to metal contact surfaces could be easily reattached on a limb of a different user.

Certain prior art disposable identification bands have been made tamper resistant by including a disabling wire in the band. For example, a co-pending U.S. patent application Ser. No. 10/400,049 on Mar. 26, 2003 by Girvin, J., and Lerch, J., entitled "Non-Reusable Identification Device", assigned to Proximities, Inc., the assignee of the present application, a disabling wire is run along the band and is arranged to disable an RFID transponder if the wire is cut.

SUMMARY OF THE INVENTION

The present invention is an identification device formed from a band of material and a non-reusable tamper-resistant fastening arranged to join opposite end regions of the band. In one preferred embodiment, a Radio Frequency Identification (RFID) transponder is disposed in the band. The transponder includes an RFID circuit, such as may be formed on an integrated circuit (IC) made of silicon or organic semiconductors, and an antenna. Circuitry in the transponder is arranged such that any cut, tear, or stretching of the band causes the RFID transponder to disable. This is typically achieved by running a conductor, referred to as a disabling wire, along substantially the entire length of the band.

The fastening mechanism is coupled to the RFID transponder such that the RFID transponder does not function when the fastening is disengaged. This is typically achieved by providing a conductive path through the fastening mechanism, such that engaging the fastener provides a path for current to flow that did not previously exist. However, alternate techniques can be used. For example, the engagement of the fastener could introduce a capacitance required for the circuit to operate.

The fastening may be constructed in the same fashion as one of many known one-way, non-reusable fasteners. Preferably, the fastening mechanism utilizes a barbed peg and mating hole, such as are commonly seen in disposable plastic bracelets made of Vinyl or Polyester.

The fastening mechanism is preferably, though not necessarily, comprised of an injection molded, hard plastic, such as Nylon. The conductor may be embedded in the fastening at the time of injection molding or inserted afterwards. The conductor is typically fragile so as to make repair of a broken trace more difficult. Alternatively, the fastening itself can be made of metal or some other suitable conductor.

In one specific implementation, the fastening becomes electrically coupled to the disabling wire at whichever point in the band the fastening is engaged, thereby shorting out the remainder of the disabling wire's path. In this embodiment, the disabling wire may be cut at any point beyond where the fastening is engaged without disrupting RFID functionality. This allows the wearer of the band to trim excess band material at the end of the band, such as with a pair of scissors or the like. The removal of excess band material is typically done with disposable plastic bands that utilize this sort of fastening mechanism, and the ability to do the same with a secure RFID wristband improves its acceptability to the user.

In an alternative embodiment, the RFID circuit itself is embedded into the fastening mechanism. This prevents an individual from enabling the RFID transponder to function by creating an electrically continuous path between two of the provided contact points for the fastener, because this action would short circuit the RFID circuit. This increases the security of the wristband to attempts to improperly enable the RFID transponder.

An electrical connection between the fastener and the transponder can be established in a number of different manners, each of which ensures that electrical continuity is broken when the fastening is disengaged. For example, the fastening mechanism may be arranged to make electrical contact with the RFID transponder at the time of manufacture. In the former case, the electrical contact can be made with solder or a conductive paste. In this instance, an electrically conductive path is typically created through the fastening only after the fastening is closed.

The fastening mechanism may alternatively make contact with the transponder at the time of fastening. For example, the fastening may serve a crimping function and in that manner make contact with the transponder once attached to the band. Pressure contact could alternatively be used to produce electrical contact.

DETAILED DESCRIPTION OF A PREFERRED EMBODIMENT

A description of preferred embodiments of the invention follows.

Figure 1:
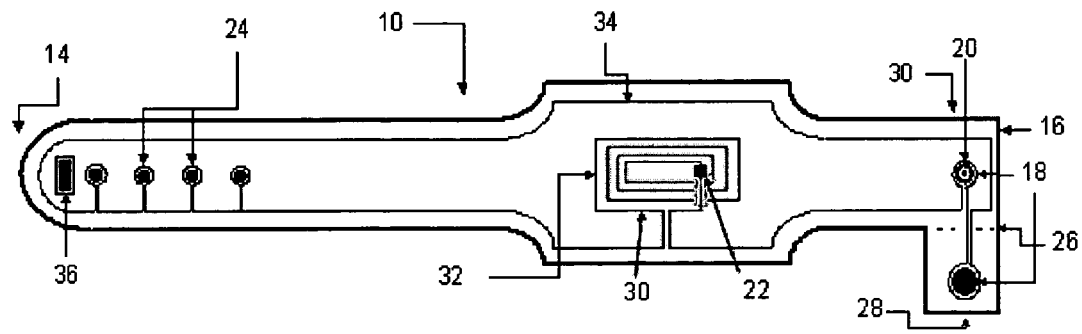
FIG. 1 is a bottom top view of a disabling RFID wristband according to the prior art.

FIG. 1 is a general illustration of a disabling Radio Frequency Identification (RFID) bracelet 10, as known in the art, in the form of elongated band 12 with opposite ends 14, 16 that can be brought together and fastened to form a closed loop. Bracelet 10 comprises a mechanical non-reusable tamper-resistant locking mechanism 18 to fasten the opposite ends 14, 16 together and to prevent the user from attempting to open the locking mechanism 18 to remove the bracelet 10 without rendering those tampering efforts visually obvious. Locking mechanism 18 comprises a barbed peg 20 and a locking hole 21 in flap 28 at one end of said band and at least one adjustment opening or adjustment hole 24 at the opposite end of said band. Adjustment holes 24 can be used to adjust the bracelet 10 to conform to body parts of different circumferences. When ends 14, 16 are brought together, the barbed peg 20 is arranged to pass through a selected hole 24 as required for a snug fit. The flap 28 is then folded along imaginary line 26 and barbed peg 20 is then passed through locking hole 21. Peg 20 is shaped to resist removal from said locking hole 21 without also destroying the locking mechanism 18 and rendering it incapable of being refastened. Alternatively, or in addition, adjustment holes 24 can be designed to replace or supplement locking hole 21 by configuring them in such a way that attempts to remove the bracelet from the barbed peg 20 would also destroy the hole 24, thereby disabling the bracelet and rendering it incapable of being refastened.

Bracelet 10 also includes a transponder 32. Transponder 32 contains an antenna 30 and an RFID integrated circuit (IC) chip 22. The transponder 32 responds to an RF interrogation signal and in response emits an RF signal representative of information pre-stored or pre-programmed into RFID chip 22. For example, the information could include the date the bracelet 10 is issued, the date the bracelet expires and will no longer be usable for access, the age status of the wearer, and whether the bracelet can be used for purchasing goods or services. Any other desired information, depending on the context in which the bracelet is to be used, may be pre-stored or pre-programmed in the transponder. The signal may also be used to access information stored in a database.

The transponder 32 derives its power, in known fashion, from its antenna 30. In the preferred embodiment, the antenna 30 has the form of a continuous electrically conductive coil. One or more tamper wires 34 extend away from the area occupied by the transponder 32. The tamper wires 34 form an electrically conductive path, from antenna 30 out to end 16 and back to antenna 30, along substantially the entire length of the band 12 of bracelet 10. As will be explained in detail below, the tamper wires 34 are arranged to connect the components of transponder 32 and/or form portions of the components themselves, such that wires 34 must remain intact for the transponder 32 to operate.

In one embodiment, one or more of the wires 34 may function as part of antenna 30. In such an embodiment, consideration should be given to the distance between the sections of the loop antenna and wires 34 in order to minimize inductance that can lead to possible interference with the operation of the other components of transponder 32.

Wires 34 are preferably, but not necessarily, made from printed conductive ink that is robust enough to withstand normal handling but fragile enough that it will be broken if a user attempts to remove the bracelet. Alternatively, wires 34 may be a thin wire such as copper wire, a thin foil, or other suitable electrically conductive material that will form an electrically continuous path but will break as a result of tampering. Forming wires 34 with frangible zones, where stresses from tampering attempts are most likely to occur, may facilitate breakage of the conductor. Of course, if the user attempts to remove the bracelet 10 with a cutting implement, the conductor forming wires 34 will also be severed as band 12 is severed.

Figure 2:
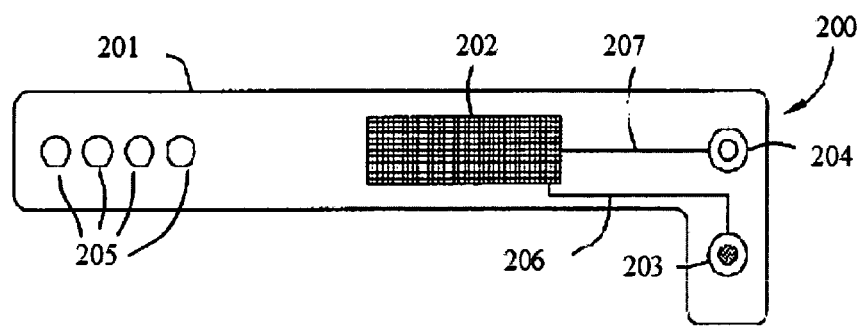
FIG. 2 is a top plan view of a wristband with a conductive snap closure mechanism as has been illustrated in prior art.

FIG. 2 illustrates a design that makes use of a conductive snap circuit closure according to the prior art. The band 200 comprises a substrate structure 201, a circuit 202, a fastener with parts 203 and 204, adjusting holes 205, and conductors 206 and 207, which connect the circuit 202 to fastener parts 203 and 204, respectively. The fastening of the band 200 enables circuit functions within circuit 202. If desired, the opening of the fastener disables functions within the circuit 202.

When the fastener closes, the parts 203 and 204 of the fastener come into contact, which creates a conductive path between conductors 206 and 207, thereby enabling functions in circuit 202. The conductors 206 and 207 may each comprise two or more separate electrical conductors that are connected to the circuit 202; the conductors 206, 207 further may comprise one or more of conductive wire or fiber, conductive foil, meltable conductor, or a printed conductor. In communication with the conductors is a fastener comprising one or more of a conductive adhesive, a conductive closure mechanism, a magnetic closure mechanism, a conductive rivet or staple, a crimped attachment, or a heat-created bond in proximity to the conductors.

Figure 3:
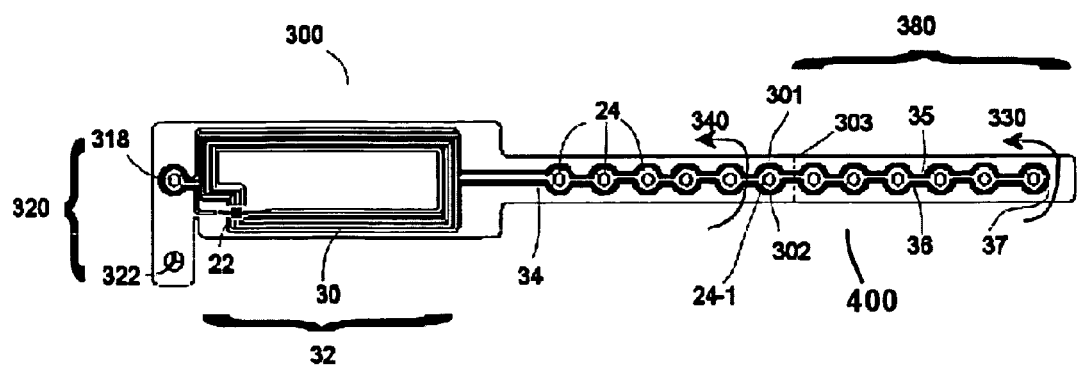
FIG. 3 is a top plan view of a wristband according to the present invention, wherein the conductive snap makes contact with the disabling wire.

FIG. 3 illustrates a principal concept of the present invention. Bracelet 300 contains a transponder 32, which is comprised of an antenna 30 and an RFID circuit 22. Bracelet 300 includes a band section 400. Antenna 30 is coupled to conductive wire 34 such that current will flow through conductive wire 34 in the path illustrated by loop 330 when transponder 32 is functioning. Conductive wire 34 is disposed on, and extends along, band section 400, and contains a top conductor 35 and a bottom conductor 36, which are joined at node 37. If a discontinuity becomes present in conductive wire 34, then transponder 32 will become disabled. Hence, conductive wire 34 is sometimes referred to as a disabling wire.

Bracelet 300 also contains a conductive snap closure 320, which is comprised of peg 318 and receiving hole 322. Bracelet 300 is affixed to a wearer's wrist, ankle, or the like by inserting peg 318 into hole 322 through one of the adjustment holes 24 selected to create a snug fit around the wrist, ankle, or the like. The conductive snap 320 is designed such that when it is closed through an adjustment hole 24, opposing disabling wire conductors 35, 36 become electrically connected through snap 320.

For example, if conductive snap 320 is closed through adjustment hole 24-1, node 301 on top conductor 35 will become directly connected to node 302 on bottom conductor 36 through conductive snap 320, thus allowing current to flow in the path illustrated by loop 340. As such, a cut can now be made across the bracelet as indicated by dotted line 303 without disabling the circuit function. This enables the wearer to remove undesired excess band portion 380 without disrupting circuit function. This is helpful because excess band portion 380 can at times be irritating, uncomfortable, and interfere with daily free movement and activity. Excess band portion or slack is typically trimmed off of non-RFID bands that utilize plastic snap fasteners when they are worn.

Figure 4:
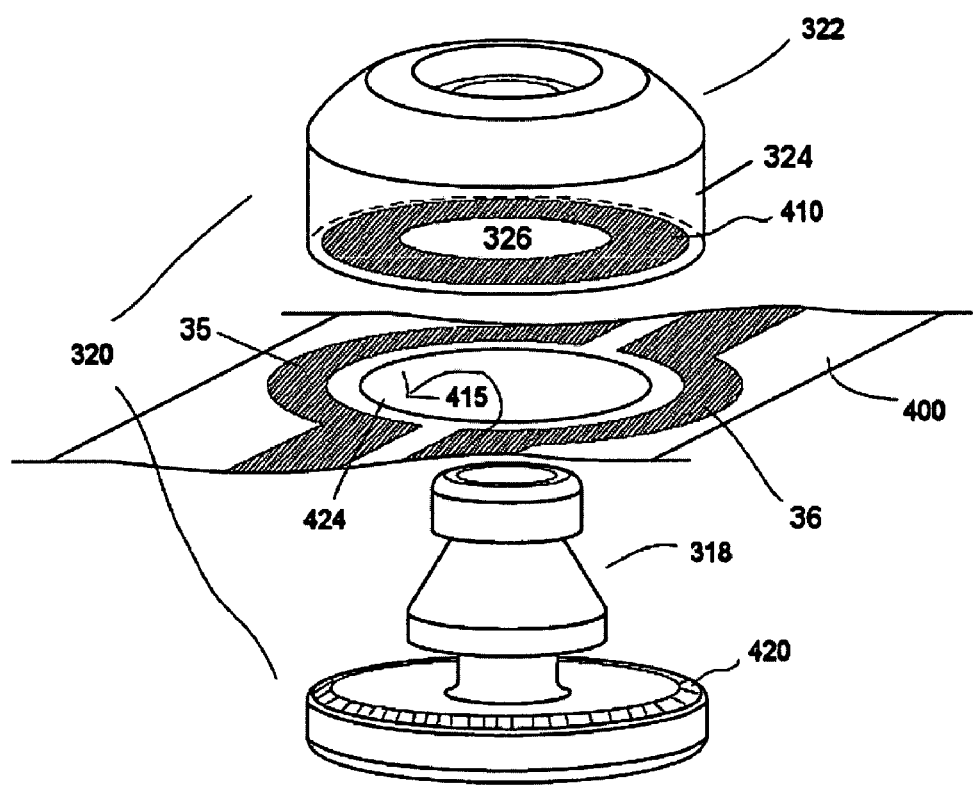
FIG. 4 is an exploded view of a conductive snap designed to connect two formerly disconnected portions on a bracelet wherever the snap is affixed.

FIGS. 4 through 7 illustrate several conductive snap concepts that can be utilized in the present invention. Shown in FIG. 4 is a conductive snap 320, acting as the fastening element, comprised of two elements; a peg 318 and a mating hole 322. Hole 322 is formed with a receiving housing 324 having an opening 326 for receiving peg 318 therethrough. A conductive ring 410 is exposed around the circumference of opening 326 such that it may make electrical contact with certain portions of the bracelet, such as band section 400. For example, when conductive snap 320 is closed through an adjustment hole 24 by inserting and locking peg piece 318 through adjustment hole 24 and into mating hole housing 324, conductive ring 410 comes into contact with wire conductors 35 and 36. As such, conductors 35 and 36 become electrically connected through conductive ring 410. In other words, current is able to flow in the direction indicated by loop 415.

Peg 318 also contains a raised section 420. When snap 320 is engaged by inserting peg 318 into mating hole 322, raised circular section 420 comes in very close proximity to conductive ring 410. When a thin membrane, such as a portion of the bracelet, is between the peg 318 and hole 322, raised section 420 applies firm pressure to the thin membrane to assist in creating a firm electrical contact between wire conductors 35 and 36 and ring 410 completing the transponder circuit while shorting the downstream loop.

Figure 5:
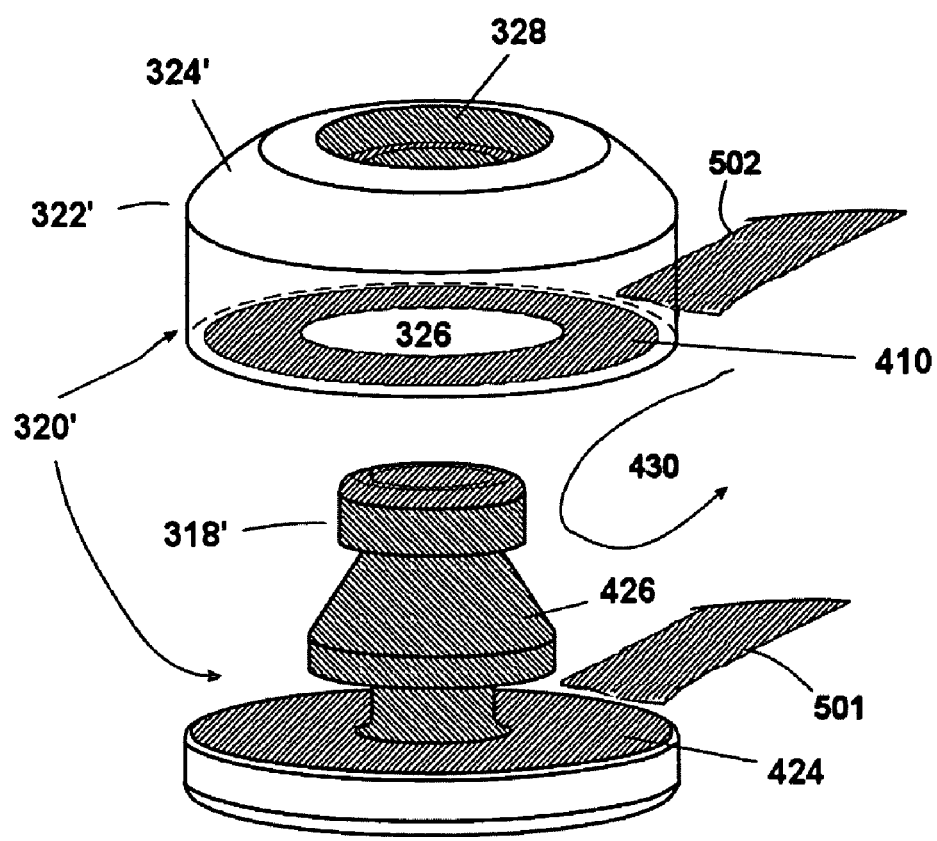
FIG. 5 is a two-piece conductive snap where the conductive path becomes formed between the two pieces when they are joined.

FIG. 5 shows an alternate conductive snap 320' closure concept. In this case, wire 501 is electrically connected to peg 318' at the time of bracelet manufacturing, as is wire 502 connected to mating hole housing 324'. Peg 318' includes a conductive head 426 and conductive circular section 424 conductively coupled to wire 501. Housing 324' includes a secondary conductive ring 328 formed within housing 324'. When peg 318' is inserted into mating hole 322', conductive head 426 and circular section 424 contact conductive rings 328, 410 establishing electrical continuity between peg 318' and housing 324', thus allowing current to flow between wires 501 and 502 as indicated by loop 430. When the two pieces are not joined together, the circuit is open and current cannot flow in the direction indicated by loop 430. In this way, circuit discontinuity can be created to ensure security in the situation when the single-use snap has been cut, pried apart, or the like.

Figure 6:
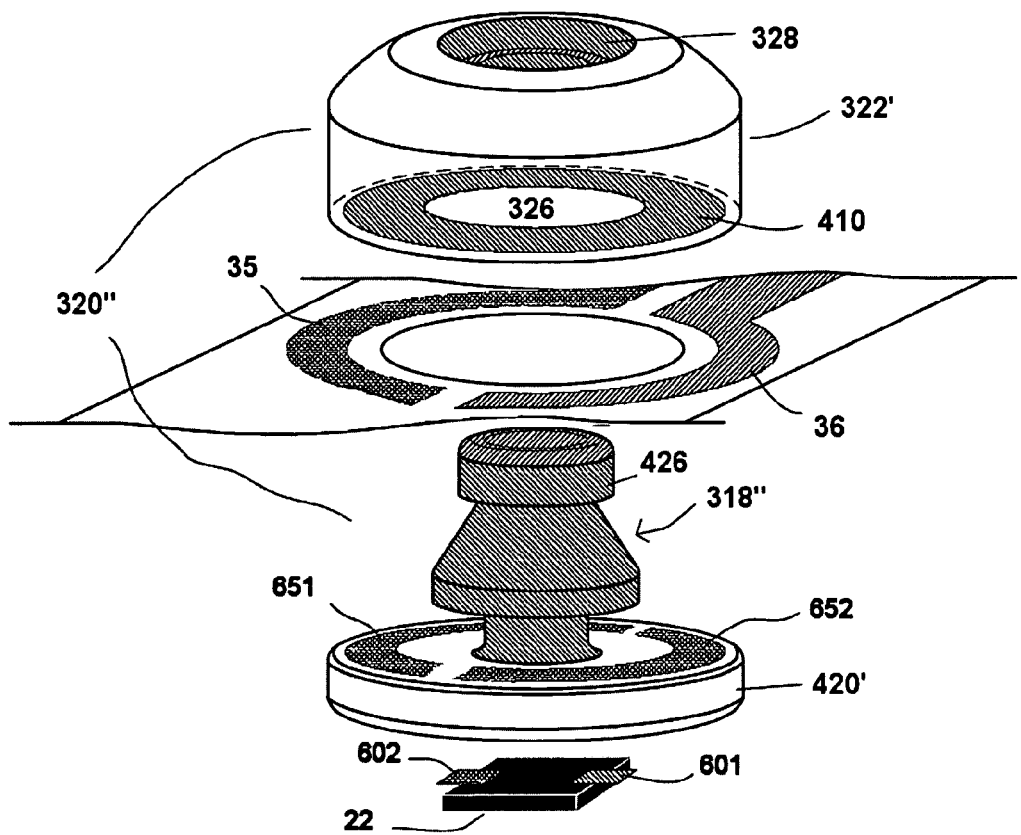
FIG. 6 is an exploded view of a conductive snap with the RFID circuit embedded within for increased stability and security.

FIG. 6 shows an embodiment of the conductive snap 320" in which the RFID circuit 22 is contained within the snap mechanism itself. This can be accomplished by creating a solder joint between RFID chip terminal 601 and conductive ring section 651 as well as a solder joint between terminal 602 and ring section 652 formed on circular section 420'. Subsequently the chip could be embedded within peg piece 318" as it is being injection molded. Conductive ring sections 651 and 652 could then be connected to conductors 35 and 36 respectively at the time of bracelet manufacturing. This will produce the desired result of connecting conductors 35 and 36 through RFID chip 22. Alternatively, optional non-conductive raised section 420' may apply additional pressure to increase the integrity of the contact made between wires 403, 404 and ring sections 651, 652 respectively.

The inclusion of RFID chip 22 inside of the snap closure mechanism has a few advantages. Placing the chip inside of the snap provides it extra protection from impact and stress. In addition, forming an electrical connection inside of the chip enables a solder-joint connection, which is stronger than a conductive adhesive connection such as is typically used for attaching circuits to thin membranes such as Vinyl and PET.

Most importantly, locating the chip 22 within snap 320" increases the tamper resilience of the overall design. The most straight-forward way to defeat most RFID wristband security measures is to create an electrical connection between two points with a conductor such as a piece of foil, a solder joint, or even a staple. This becomes particularly important when contact points are being provided for the conductive snap to make electrical connection to, since it facilitates this procedure. With the RFID circuit chip 22 contained inside of the snap closure 320, shorting to the available contact points would short-circuit the chip, thereby rendering the RFID transponder disabled.

In addition to including RFID chip 22 within snap closure 320", RFID antenna 30 or a portion thereof could also be included within snap closure 320". Alternatively, in another embodiment, a separate tamper detection element could be contained within the snap. Examples of such tamper detection elements include electronic article surveillance tags that may use RF technology, electromagnetic (EM) technology, or acousto-magnetic (AM) technology. This type of dual transponder security wristband, which separates the identification function from the security function, is described in detail in pending U.S. patent application Ser. No. 11/095,017 on Mar. 31, 2005 by Lerch, J., Girvin, J., and Norair, J. entitled "Identification Band with Regions Having Electro-Magnetically Detectable Regions", assigned to Proximities, Inc., the assignee of the present application.

The variations in circuitry contained within the snap closure mechanism that are illustrated in FIGS. 4 through 6 are just a few examples of potential implementations of a conductive snap. For example, the conductive ring in FIG. 4 could just as easily be formed on the peg 318. Likewise, the method of inserting the RFID circuit chip inside of the snap closure mechanism as depicted in FIG. 6 could just as easily be implemented in a design that creates current flow through both the peg 318' and mating hole 322', such as is illustrated in FIG. 5.

Figure 7:
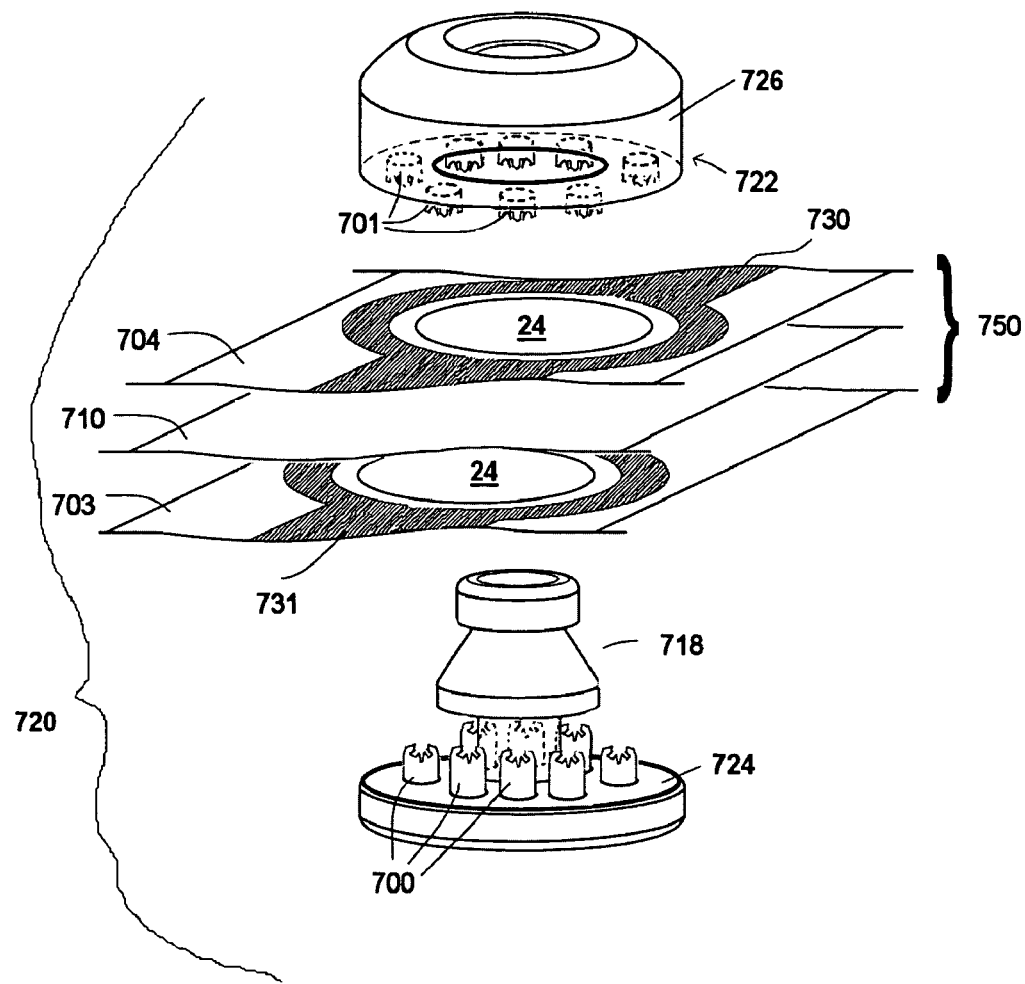
FIG. 7 is an exploded view of a crimping snap closure mechanism.

FIG. 7 illustrates yet another alternative method for creating continuity between two nodes in a bracelet circuit with a snap attachment mechanism. Unlike the other embodiments, this method does not require electrical conduction to occur through or within the snap closure mechanism itself. Rather, snap 720 acts as a crimping tool for crimping circuit paths on different layers together.

Specifically, snap closure mechanism 720 is comprised of a modified peg 718 and a modified mating hole 722. Peg 718 has several crimping posts 700 extending from circular portion 724. Hole housing 726 has several crimping posts 701 that are complementary to crimping posts 700. When peg piece 718 is inserted into hole piece 722 through bracelet section 750, conductor layers 703 and 704, surrounding an adjustment hole 24, as well as through substrate layer 710 are partially pierced and folded over by complementary crimping posts 700 and 701. This piercing and folding action creates a crimped electrical contact between wires 730 and 731 in bracelet section 750. As such, crimping snap pieces 718, 722 are capable of achieving the same outcomes as FIG. 4 and FIG. 5 without any conductive material in the snap closure mechanism.

In this embodiment, snap closure pieces 718, 722 are preferably injection molded out of a hard plastic such as Nylon. Alternatively, metal teeth could be utilized to form part of crimping mechanism 700/701.

It should be understood now that we have explained but a few of the possible embodiments, and that other arrangements of loops and of shorting wires can be used to accomplish the objectives of the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. An identification apparatus, comprising:
   a band with a plurality of adjustment holes;
   an RFID transponder, comprised of an RFID circuit and an antenna disposed on the band;
   two conductive paths disposed on opposing surfaces of the band, at least one layer of the band electrically insulating the two conductive paths from each other, each conductive path running longitudinally and substantially a length of the band and parallel to the adjustment holes, a first end of each conductive path connected to the RFID circuit and a second end of each conductive path electrically open; and
   a fastening mechanism for joining the band in a closed loop at one of the plurality of adjustment holes; and said fastening mechanism including at least two elements configured to pierce the at least one layer of the band proximate to the one of the plurality of adjustment holes and crimp the two conductive paths into an electrically closed path, thereby creating electrical continuity on the band at a selected one of the plurality of adjustment holes for enabling the RFID circuit when said fastening mechanism joins said band in the closed loop.

2. The apparatus of claim 1, wherein the fastening mechanism is electrically isolated from the RFID transponder until said fastening mechanism joins said band in a closed loop.

3. The apparatus of claim 1, wherein an excess band portion can be removed once the fastening mechanism has been engaged without disabling transponder functionality.

4. The apparatus of claim 1, further comprising at least one conductor operatively coupled to said RFID transponder, the fastening mechanism being adapted to tear at least one conductor when disengaged.

5. The apparatus of claim 1, wherein each element includes a respective electrical contact point such that the RFID transponder ceases to function when said respective electrical contact points are out of contact with each other.

* * * * *

UNITED STATES PATENT AND TRADEMARK OFFICE
CERTIFICATE OF CORRECTION

| | | |
|---|---|---|
| PATENT NO. | : 7,535,356 B2 | Page 1 of 1 |
| APPLICATION NO. | : 11/291095 | |
| DATED | : May 19, 2009 | |
| INVENTOR(S) | : John W. Lerch, Joshua M. Girvin and John P. Norair | |

It is certified that error appears in the above-identified patent and that said Letters Patent is hereby corrected as shown below:

Claim 1, Column 8, line 34: delete "substantially a" and insert --substantially the--

Claim 3, Column 8, line 52: delete "an excess" and insert --the excess--

Signed and Sealed this

Fourth Day of August, 2009

JOHN DOLL
*Acting Director of the United States Patent and Trademark Office*